US009650540B2

(12) United States Patent  
Cheng et al.

(10) Patent No.: US 9,650,540 B2  
(45) Date of Patent: May 16, 2017

(54) RADIATION CURABLE COATING COMPOSITIONS COMPRISING A LACTIDE REACTION PRODUCT

(75) Inventors: Shan Cheng, Sewickley, PA (US); Hongying Zhou, Allison Park, PA (US); David R. Fenn, Allison Park, PA (US); Jackie L. Kulfan, Valencia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1788 days.

(21) Appl. No.: 12/266,588

(22) Filed: Nov. 7, 2008

(65) Prior Publication Data

US 2010/0055469 A1  Mar. 4, 2010

Related U.S. Application Data

(63) Continuation-in-part of application No. 12/202,820, filed on Sep. 2, 2008.

(51) Int. Cl.
*C09B 67/00* (2006.01)
*C09D 167/07* (2006.01)

(52) U.S. Cl.
CPC .......... *C09D 167/07* (2013.01); *Y02P 20/582* (2015.11); *Y10T 428/31507* (2015.04); *Y10T 428/31678* (2015.04); *Y10T 428/31989* (2015.04)

(58) Field of Classification Search
USPC .................................................. 106/287.21
See application file for complete search history.

(56) References Cited

U.S. PATENT DOCUMENTS

| | | | |
|---|---|---|---|
| 3,966,572 A | 6/1976 | Carder | |
| 4,119,640 A | 10/1978 | Hodakowski | |
| 4,153,776 A * | 5/1979 | Friedlander et al. | 528/49 |
| RE30,772 E * | 10/1981 | Friedlander et al. | 525/421 |
| 4,296,947 A | 10/1981 | Spatz | |
| 4,330,643 A * | 5/1982 | Ogasawara et al. | 525/445 |
| 4,352,924 A * | 10/1982 | Wooten et al. | 528/302 |
| 4,977,207 A | 12/1990 | Hoefer | |
| 5,225,521 A | 7/1993 | Spinu | |
| 5,270,400 A | 12/1993 | Spinu | |
| 5,352,730 A * | 10/1994 | Luhmann et al. | 524/37 |
| 5,359,026 A | 10/1994 | Gruber | |
| 5,399,666 A | 3/1995 | Ford | |
| 5,563,206 A | 10/1996 | Eicken | |
| 5,714,573 A | 2/1998 | Randall | |
| 5,849,401 A | 12/1998 | El-Afandi | |
| 6,107,433 A | 8/2000 | Petrovic | |
| 6,355,310 B1 | 3/2002 | Saint Victor | |
| 6,538,059 B1 | 3/2003 | Muller | |
| 6,686,435 B1 | 2/2004 | Petrovic | |
| 6,916,547 B2 | 7/2005 | Tian | |
| 7,256,250 B2 | 8/2007 | Tuominen | |
| 2005/0260405 A1 | 11/2005 | Dietsche | |
| 2007/0175793 A1 * | 8/2007 | Narine et al. | 208/49 |
| 2007/0258687 A1 * | 11/2007 | Yamamoto et al. | 385/128 |
| 2007/0299156 A1 * | 12/2007 | Brown | 106/287.24 |
| 2008/0004369 A1 | 1/2008 | Seppala | |
| 2008/0176061 A1 | 7/2008 | Ambrose | |
| 2009/0018237 A1 * | 1/2009 | Fujii et al. | 523/201 |
| 2009/0239433 A1 * | 9/2009 | Kurihara et al. | 442/164 |

FOREIGN PATENT DOCUMENTS

| | | |
|---|---|---|
| CA | 2628551 A1 * | 5/2007 |
| DE | 1520648 | 7/1969 |
| EP | 0293905 | 12/1988 |
| EP | 0640632 A1 | 3/1995 |
| EP | 0778304 B1 | 6/1997 |
| EP | 1 482 001 A1 | 12/2004 |
| EP | 1849810 A1 | 10/2007 |
| EP | 2065421 | 6/2009 |
| GB | 2164949 A | 4/1986 |
| JP | 62020522 | 1/1987 |
| JP | 08100057 | 4/1996 |
| JP | 20022348366 | 12/2002 |
| JP | 2003 138165 A | 5/2003 |
| JP | 2007-025656 | 2/2007 |
| WO | 92/00336 | 1/1992 |
| WO | 97/27253 | 7/1997 |
| WO | 9950345 | 10/1999 |
| WO | 03/033563 A1 | 4/2003 |
| WO | WO 2004087812 A1 * | 10/2004 |
| WO | 2004/096882 | 11/2004 |
| WO | 2006/007591 Al | 1/2006 |
| WO | 2007/019051 A1 | 2/2007 |
| WO | 2008029527 | 3/2008 |
| WO | 2009/105625 A | 8/2009 |

OTHER PUBLICATIONS

Helminen, Antii. "Branched and Crosslinked Resorbable Polymers Based on Lactic Acid, Lactide and e-Caprolactone", Polymer Technology Publication Series, Dissertation presented at Helsinki University of Technology, Espoo 2003, No. 26 (Dec. 19, 2003) pp. 1-57.*

Dimmers, Markus, "Sustaining resources", Polymers Paint Colour Journal, Aug. 2007; pp. 22-24, dmg world media (uk) ltd, Redhill, Surrey, United Kingdom.

"Use of Soybean oil in coatings", Polymers Paint Colour Journal, Mar. 6, 1991; pp. 119-126, vol. 181, No. 4278, dmg world media (uk) ltd, Redhill, Surrey, United Kingdom.

Peshane, Sunil N. et al., "Oil-modified PUDs: cross-linkable, VOC compliant, cost effective", European Coatings Journal, 2003, pp. 105-110, 88 (3), Vincentz Network, Hannover, Germany.

Shukla, Jignesh M. et al., "Epoxy PUR goes bio", European Coatings Journal, 2006, pp. 38-45, 38 (11), Vincentz Network, Hannover, Germany.

"Modern Polyurethane dispersions for wood and plastic varnishes", European Coatings, May 2007; pp. 102-103, Vincentz Network, Hannover, Germany.

\* cited by examiner

*Primary Examiner* — Kaj K Olsen
*Assistant Examiner* — Ross J Christie
(74) *Attorney, Agent, or Firm* — Diane R. Meyers

(57) ABSTRACT

A coating comprising the reaction product of a natural oil derived polyol, a lactide and a radiation curable moiety, such as a (meth)acrylate, are disclosed.

19 Claims, No Drawings

RADIATION CURABLE COATING COMPOSITIONS COMPRISING A LACTIDE REACTION PRODUCT

CROSS-REFERENCE TO RELATED APPLICATION

This patent application is a Continuation-In-Part (CIP) of U.S. patent application Ser. No. 12/202,820 filed Sep. 2, 2008, entitled: "RADIATION CURABLE COATING COMPOSITIONS COMPRISING A LACTIDE REACTION PRODUCT".

FIELD OF THE INVENTION

The present invention is directed to a radiation curable coating comprising the reaction product of a natural oil derived polyol, a lactide, and a compound comprising a radiation curable moiety.

BACKGROUND OF THE INVENTION

The price of raw materials used in many manufacturing processes continues to rise, particularly those whose price rises or falls with the price of oil. Because of this, and because of the predicted depletion of oil reserves, raw materials derived from renewable resources or alternative resources may be desired. An increase in demand for environmentally friendly products, together with the uncertainty of the variable and volatile petrochemical market, has promoted the development of raw materials from renewable and/or inexpensive sources.

SUMMARY OF THE INVENTION

The present invention is directed to a radiation curable coating comprising the reaction product of a) a natural oil derived polyol; b) a lactide; and c) a compound comprising a radiation curable moiety, wherein the radiation curable moiety is on the terminus of the reaction product and not within the backbone of the reaction product.

DETAILED DESCRIPTION OF THE INVENTION

The present invention is directed to a radiation curable coating comprising the reaction product of a) a natural oil derived polyol, b) a lactide, and c) a compound comprising a radiation curable moiety; upon reaction of a, b and c to form the reaction product, the radiation curable moiety is on the terminus of the reaction product and not within the backbone of the reaction product. This reaction product is sometimes referred to herein as the "lactide reaction product", or "reaction product" or like terms.

It will be appreciated by those skilled in the art that the natural oil derived polyol will react with the lactide to form a polyol containing poly(lactic acid) units. In certain embodiments, the coatings of the present invention comprise 5 weight % or greater poly(lactic acid) units derived from lactide, such as 10 weight % or greater or 30 weight % or greater, with weight % based on total solid weight.

Any natural oil derived polyol can be used according to the present invention. A natural oil derived polyol is a polyol that derives from an oil that occurs in nature. Suitable polyols can include, but are not limited to, those derived from natural oils such as castor oil, peanut oil, soy bean oil or canola oil. These polyols occur in nature; that is, they are biomass derived. A biomass derived compound will be understood to be a compound derived from a living or recently living organism, for example, plants (including trees) or animals and not from a petroleum based source. The hydroxyl groups present in these polyols can be naturally occurring or they can be introduced, for example, by modification of carbon-carbon double bonds present in the oils. Natural oil derived polyols are described in United States Patent Publication Number 2006/0041156 A1, U.S. Pat. No. 7,084,230, WO 2004/096882 A1, U.S. Pat. No. 6,686,435, U.S. Pat. No. 6,107,433, U.S. Pat. No. 6,573,354 and U.S. Pat. No. 6,433,121, all of which are incorporated in their entirety herein. Methods of modifying carbon-carbon double bonds to introduce hydroxyl groups include treatment with ozone, air oxidation, reaction with peroxides or hydroformylation (as described in "Polyols and Polyurethanes from Hydroformylation of Soybean Oil", Journal of Polymers and the Environment, Volume 10, Numbers 1-2, pages 49-52, April, 2002, incorporated herein in its entirety). A particularly suitable polyol is a soy polyol. Soy polyols are commercially available from Cargill Inc., Urethane Soy Systems Co. and Biobased Technologies. In certain other embodiments, the polyol is derived from a recycled polymer, such as a polyester.

Similarly, any suitable lactide can be used, such as L-lactide, meso-lactide or D-lactide. Mixtures of any of the isomers can also be used. Lactide is the cyclic diester of lactic acid (2-hydroxypropionic acid). Suitable lactides are also commercially available.

The reaction product of the present invention further comprises a compound comprising a radiation curable moiety. Such compounds include, for example, (meth)acrylate (meth)acrylic acid, and (meth)acryloyl chloride. Particularly suitable compounds comprising a radiation curable moiety are compounds comprising a radiation curable moiety and an isocyanate group such as 2-isocyanatoethyl(meth)acrylate, and the reaction products of diisocyanates and hydroxyalkl acrylates, for example the reaction product of a 1:0.8 to 1:1.2 molar ratio of isophorone diisocyanate and hydroxyethyl acrylate. Other suitable compounds comprising a radiation curable moiety are compounds comprising a vinyl group such as a vinyl ether group. As used herein, "(meth)acrylate" and like terms refers to both acrylate and the corresponding methacrylate. It will be appreciated that the compound comprising a radiation curable moiety used according to the present invention comprises at least one functionality that reacts with component a and/or b in the formation of the lactide reaction product in addition to at least one radiation curable moiety that does not react in the formation of the reaction product. At least some of these compounds may also be biomass derived.

The lactide reaction product of certain embodiments of the present invention can be formed by first reacting the lactide and the compound containing two or more natural oil derived polyols. The reaction between the lactide and natural oil derived polyol can be carried out under any suitable conditions. For example, the lactide can be mixed and heated to a temperature of 100-200° C., such as 120-150° C., for a period of two to ten hours. The reaction can be carried out in the presence of a catalyst, for example complexes of tin, aluminum, zinc and lanthanides. Tin compounds such as tin(II) 2-ethylhexanoate are particularly suitable. The reaction can be carried out in bulk or in the presence of solvent(s).

Following reaction between the natural oil derived polyol and the lactide, the product is further reacted with a compound comprising a radiation curable moiety. This reaction can be carried out under any suitable conditions. For example, when the compound comprising a radiation curable moiety is a compound comprising a radiation curable moiety and an isocyanate group, the reaction can be carried out at 20-160° C., such as 20-80° C., optionally in the presence of a suitable catalyst such as dibutyltin dilaurate. The molar ratio of the hydroxyl groups on the natural oil derived polyol to lactide can be 1:02 to 1:20, such as 1:0.4 to 1:10 or 1:0.5 to 1:4. The molar ratio of the hydroxyl groups on the natural oil derived polyol to compound comprising a radiation curable moiety can be 1:0.2 to 1:2, such as 1:0.4 to 1:1.2 or 1:0.8 to 1:1.1.

The lactide reaction product can have a hydroxyl value of 0 to 120, such as 0 to 50, or 0 to 20. This reaction product can have a number average molecular weight as determined by GPC ("Mn") of 250 to 10,000, such as 400 to 6000, or 500 to 2000.

It will be appreciated by those skilled in the art that a functional group on the compound comprising a radiation curable moiety will react with the reaction product of the natural oil derived polyol and lactide, such that at least some of the compound comprising the radiation curable moiety will be located at the end of a poly(lactic acid) segment. Moreover, it will be understood that the radiation curable moiety will remain unreacted during formation of the lactide reaction product. In this manner, the resulting reaction product has a radiation curable moiety at the terminus. This radiation curable moiety can then be reacted with other radiation curable moieties to form a coating that has been cured by radiation; that is, a "radiation curable coating".

When unmodified soy polyols and other biomass derived polyols are used in coatings, such coatings may have reduced hardness, adhesion, solvent resistance, and resistance to chemicals, for example, those found in skin lotions, sun protection creams and insect repellants and/or degradation of other properties as compared to coatings having petroleum based polyols. This is believed to be due to the low glass transition temperature ("Tg") and the low reactivity of the secondary hydroxyl groups present in such polyols. The present inventors have discovered that use of the reaction products described herein provides improved properties when used in coatings, as compared to use in coatings of unmodified biomass derived polyols.

In certain embodiments, 40 weight % or greater, such as 60 weight % or greater, or 80 weight % or greater of the carbon content of the lactide reaction product described herein originates directly from biomass, with weight % based on total weight of the reaction product. It will be appreciated that combinations of biomass derived natural oil derived polyol and/or combinations of biomass derived lactides and/or combinations of biomass derived compounds comprising radiation curable moieties can be used, and that these components need not be derived from the same type of biomass. In certain embodiments, >15 weight %, such as >25 weight %, or >50 weight % of the carbon content of any of the coatings described herein originates directly from biomass, with weight % based on total solids weight of the coating.

The coatings of the present invention can comprise 2 to 100 weight %, such as 20 to 85, or 30 to 70 weight %, of one or more of the lactide reaction products described herein, with weight % based on total solids weight of the coating.

It will be appreciated by those skilled in the art, that upon reaction of the natural oil derived polyol and the lactide, poly(lactic acid) units will be formed. In certain embodiments, the present coatings comprise 5 weight % or greater poly(lactic acid) units derived from lactide, such as 15 weight % or greater, or 30 weight % or greater, with weight % based on total solids weight of the coating.

It will be appreciated that when one or more of the present reaction products are used in a coating according to the present invention, it can form all or part of the film-forming resin of the coating. In certain embodiments, one or more additional film-forming resins are also used in the coating. For example, the coating compositions can comprise any of a variety of thermoplastic and/or thermosetting compositions known in the art. The coating compositions may be water based or solvent based liquid compositions, or, alternatively, may be in solid particulate form, i.e., a powder coating.

Thermosetting or curable coating compositions typically comprise film-forming polymers or resins having functional groups that are reactive with either themselves or a crosslinking agent. The additional film-forming resin can be selected from, for example, acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof.

Appropriate mixtures of film-forming resins may also be used in the preparation of the coating compositions.

If additional thermosetting coating compositions are used, they may be self-crosslinking, that is, they may have functional groups that are reactive with themselves, or a crosslinking agent may be added. The crosslinking agent can comprise polyisocyanates, aminoplasts, polyepoxides, beta hydroxyalkylamides, polyacids, anhydrides, organometallic acid-functional materials, polyamines, polyamides, and mixtures of any of these, all of which are known in the art.

It will be appreciated that if the coatings of the present invention further comprise an additional film-forming resin that is thermosetting or thermoplastic, the coating will be "dual cure". That is, the coating will cure via the radiation curable moieties and also will cure via thermosetting or thermoplastic cure. Alternatively, the reaction products described herein can have functionality that will render the lactide reaction product itself dual cure or they can be further reacted with components having functionality that will render the lactide reaction product dual cure. In certain embodiments, the lactide reaction product can comprise a radiation curable moiety and a hydroxy group, for example, which can be further reacted with an appropriate crosslinker. As used herein, the term "thermoplastic and/or thermosetting moiety" and like terms refers to an additional film-forming resin that is thermoplastic or thermosetting, and/or functionality on the lactide reaction product that renders the lactide reaction product thermoplastic and/or thermosetting (in addition to radiation curable).

The coating compositions of the present invention may also include a solvent and/or reactive diluent in one or more of the components. The coatings can also be 100% solids. Suitable solvents include water, organic solvent(s) and/or mixtures thereof. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The solvents can be biomass derived. Examples of biomass derived solvents include esters of lactic acid and esters of soybean oil fatty acid. In certain embodiments, the solvent is a non-aqueous solvent. "Non-aqueous solvent" and like terms means that less than 50 percent of the solvent is water. For example, less than 10 percent, or even less than 5 percent of the solvent can be water. It will be understood that mixtures of solvents, including or excluding water in an amount of less than 50 percent, can constitute a "non-aqueous solvent". In other embodiments, the coating is aqueous or water-based. This means that 50% or more of the solvent is water. These embodiments have less than 50%, such as less than 20%, less than 10%, less than 5%, or less than 2% solvent.

If desired, the coating compositions can comprise other optional materials well known in the art of formulating coatings in any of the components, such as colorants, plasticizers, anti-oxidants, abrasion resistant particles, hindered amine light stabilizers, UV light absorbers and stabilizers, surfactants, flow control agents, antifoaming agents, wetting agents, thixotropic agents, fillers, waxes, lubricants, fortifiers, stabilizers, organic cosolvents, reactive diluents, catalysts, grind vehicles, and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference in its entirety. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. patent application Ser. No. 10/876,031 filed Jun. 24, 2004, which is incorporated herein by reference in its entirety, United States Patent Application Publication Number 2005-0287348 A1, filed Jun. 24, 2004, and United States Patent Application Publication Number 2006-0251897, filed Jan. 20, 2006, which are also incorporated herein by reference in their entirety.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference in its entirety. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. patent application Ser. No. 10/892,919 filed Jul. 16, 2004, and incorporated herein by reference in its entirety.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion resistant particle" is one that, when used in a coating, will impart some level of abrasion resistance to the coating as compared with the same coating lacking the particles. Suitable abrasion resistant particles include organic and/or inorganic particles. Examples of suitable organic particles include but are not limited to diamond particles, such as diamond dust particles, and particles formed from carbide materials; examples of carbide particles include but are not limited to titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. Nano-sized silica is particularly useful. Such nanoparticles may be introduced as a dispersion, such as a dispersion in a radiation curable monomer or a dispersion in an organic solvent. The particles can be nanoparticles, having an average particle size of less than 0.1 micron, such as 0.8 to 500, 10 to 100, or 100 to 500 nanometers, or any combination within these ranges. Nano-sized silica is particularly useful.

The compositions of the present invention may also further comprise a photoinitiator, such as one standardly used in the art to catalyze or accelerate cure if such cure is by exposure to ultraviolet radiation. Any suitable photoinitiator can be used, including any of the known photoinitiators such as benzophenone, benzoin, acetophenone, benzoin methyl ether, Michler's ketone, benzoin butyl ether, xanthone, thioxanthone, propiophenone, fluorenone, carbazole, diethoxyacetophenone, the 2-, 3- and 4-methylacetophenones and methoxy-acetophenones, the 2- and 3-chloroxanthones and chlorothioxanthones, 2-acetyl-4-methylphenyl acetate, 2,2'-dimethoxy-2-phenylacetophenone, benzaldehyde, fluorene, anthraquinone, triphenylamine, 3- and 4-allyl-acetophenone, p-diacetylbenzene, 3-chloro-2-nonylxanthone, 2-chlorobenzophenone, 4-methoxybenzophenone, 2,2',4,4'-tetrachlorobenzophenone, 2-chloro-4'-methylbenzophenone, 4-chloro-4'-methylbenzophenone, 3-methylbenzophenone, 4-tert.butylbenzophenone, isobutyl ether-benzoic acetate, benzil benzilic acid, amino benzoate, methyl blue, 2,2-diethoxyacetophenone, 9,10-phenanthrenequinone, 2-methyl anthraquinone, 2-ethyl anthraquinone, 1-tert.butylanthraquinone, 1,4-naphthaquinone, isopropylthioxanthone, 2-isopropylthioxanthone, 2-methylthioxanthone, 2-decylthioxanthone, 2-dodecylthioxanthone, 2-methyl-1, [4-(methyl thio)phenyl]-2-morpholinopropanone-1, combinations thereof and the like.

It will be appreciated that the dual cure coatings described herein can be either one component ("1K"), or multi-component compositions such as two component ("2K"). A 1K composition will be understood as referring to a composition wherein all the coating components are maintained in the same container after manufacture, during storage, etc. A 1K coating can be applied to a substrate and cured by any conventional means, such as by heating, forced air, and the like. The present coatings can also be 2K coatings or multi-component coatings, which will be understood as coatings in which various components are maintained separately until just prior to application.

As noted above, the coatings described are radiation curable. "Radiation curable" includes coatings that are dual cure. A radiation curable coating will be understood as one that is cured by exposure to high energy or actinic radiation. A class of high energy bombardment includes energetic electrons such as those derived from isotopes such as strontium-90, or intense electron beams produced by particle accelerators. Electron beam curing is most useful in applications where very rapid and economical rates are desired. In some systems, curing periods of less than about one second may be used, which is a total radiation dose of less than about 0.25 megarads.

A class of actinic radiation useful according to the present invention is ultraviolet light; also suitable are other forms of actinic radiation that are normally found in radiation emitted from the sun or from artificial sources such as Type RS Sunlamps, carbon arc lamps, xenon arc lamps, mercury vapor lamps, tungsten halide lamps, and the like. Ultraviolet radiation may be used most efficiently if the coating comprises a photocuring rate accelerator. Curing periods of from 1 second to 15 minutes are typical.

The present coatings can be applied to any substrate known in the art, for example automotive substrates and industrial substrates. These substrates can be, for example, metallic or non-metallic, including polymeric, plastic, polycarbonate, polycarbonate/acrylobutadiene styrene ("PC/ABS"), polyamide, wood, veneer, wood composite, particle board, medium density fiberboard, cement, stone, and the like. In a particularly suitable embodiment of the present invention, the substrate itself is biodegradable. Biodegradable substrates include, for example paper, wood and biodegradable plastics such as cellulose, poly(lactic acid), poly (3-hydroxybutyrate) and starch based plastics. In addition, the substrate can be one that has been recycled. The substrate can also be one that has already been treated in some manner to impart color or other visual effect. For example, a wood substrate that has been stained may then be coated according to the present invention, as can a substrate that has already had one or more other coating layers applied to it.

As used herein, the term "polyamide substrate" refers to a substrate constructed from a polymer that includes repeating units of the formula:

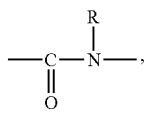

wherein R is hydrogen or an alkyl group. The polyamide may be any of a large class of polyamides based on aliphatic, cycloaliphatic, or aromatic groups in the chain. They may be formally represented by the products of condensation of a dibasic amine with a diacid and/or diacid chloride, by the product of self-condensation of an amino acid, such as omega-aminoundecanoic acid, or by the product of a ring-opening reaction of a cyclic lactam, such as caprolactam, lauryllactam, or pyrrolidone. They may contain one or more alkylene, arylene, or aralkylene repeating units. The polyamide may be crystalline or amorphous. In certain embodiments, the polyamide substrate comprises a crystalline polyamide of alkylene repeating units having from 4 to 12 carbon atoms, such as poly(caprolactam) (nylon 6), poly(lauryl-lactam) (nylon 12), poly(omega-aminoundecanoic acid) (nylon 11), poly(hexamethylene adipamide) (nylon 6.6), poly(hexamethylene sebacamide) (nylon 6.10), and/or an alkylene/arylene copolyamide, such as that made from meta-xylylene diamine and adipic acid (nylon MXD6). The term "nylon" includes all of these products as well as any other compound referred to in the art as nylon. Amorphous polyamides, such as those derived from isophoronediamine or trimethylcyclohexanediamine, may also be utilized. Blends of polyamides may also be utilized.

As used herein, the term "polyamide", when used in reference to a substrate, includes a reinforced polyamide substrate; a reinforced polyamide substrate is a polyamide substrate constructed from a polyamide that has been reinforced through the inclusion of, for example, fibrous materials, such as glass fiber or carbon fiber, or inorganic fillers, such as calcium carbonate, to produce a polyamide having increased rigidity, strength, and/or heat resistance relative to a similar polyamide that does not include such reinforcing materials. Reinforced polyamides, which are suitable for use as a substrate material in accordance with certain embodiments of the present invention, are commercially available and include, for example, those materials commercially available from Solvay Advanced Polymers under the IXEF name and, include, for example, the IXEF 1000, 1500, 1600, 2000, 2500, 3000 and 5000 series products; from EMS-Chemie Inc., Sumter, S.C., under the GRILAMID, GRIVORY, GRILON and GRILFLEX tradenames; and DuPont Engineered Polymers, such as those sold under the THERMX and MINLON tradenames.

The coatings of the present invention can be applied by any means standard in the art, such as electrocoating, spraying, electrostatic spraying, dipping, rolling, brushing, and the like.

The coatings can be applied to any dry film thickness, such as 0.1 to 4 mils, 0.3 to 2 mils or 0.7 to 1.3 mils. The coatings of the present invention can be used alone, or in combination with other coatings. For example, the coating can comprise a colorant or not and can be used as a primer, ecoat, basecoat, top coat, automotive repair coat, and the like. For substrates coated with multiple coatings, one or more of those coatings can be coatings as described herein.

As used herein, unless otherwise expressly specified, all numbers such as those expressing values, ranges, amounts or percentages may be read as if prefaced by the word "about", even if the term does not expressly appear. Also, any numerical range recited herein is intended to include all subranges subsumed therein. Singular encompasses plural and vice versa. For example, although reference is made herein, including the claims, to "a" natural oil derived polyol, "a" lactide, "a" compound comprising a radiation curable moiety, "a" lactide reaction product, "a" crosslinker, and the like, one or more of any of these compounds can be used. Similarly, while the reaction products of the present invention are sometimes collectively referred to herein in the plural, i.e. reaction products, use of only one of any reaction product is within the scope of the present invention. "Including" means "including, but not limited to". As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

| | Ingredients | Parts by weight |
|---|---|---|
| Charge # 1 | BiOH 1560[1] | 414.34 |
| | 2,6-di-tert-butyl-4-methylphenol | 0.38 |
| Charge # 2 | AOI[2] | 234.62 |

[1]Soy polyol available from Cargill, Incorporated, hydroxyl value 232 mg KOH/g.
[2]Acryloyloxy ethyl isocyanate, available from Showa Denko.

Charge #1 was added into a flask equipped with a stirrer, a water-cooled condenser, a thermocouple, and a sparge tube that delivered an air stream under the surface of the reaction mixture.

Charge #2 was added drop wise at such a rate as to keep the temperature between 50 to 70° C. 15 minutes after the completion of the addition, the isocyanate content was monitored by infra-red spectroscopy. The band at 2267 cm$^{-1}$ was absent, indicating that the reaction was complete.

Example 2

| | Ingredients | Parts by weight |
|---|---|---|
| Charge # 1 | BiOH 1560 | 281.65 |
| | DL-lactide[3] | 167.88 |
| | toluene | 47.18 |
| Charge # 2 | Stanous octoate | 0.47 |
| | toluene | 2.82 |
| Charge # 3 | 2,6-di-tert-butyl-4-methylphenol | 0.66 |
| | AOI | 156.35 |

[3]Available from NatureWorks LLC.

Charge #1 was added into a flask equipped with a stirrer, a nitrogen inlet, a thermocouple, and set up for azeotropic distillation with a toluene filled Dean-Stark trap topped by a water-cooled condenser. Stirring and a nitrogen flow were started and the temperature was increased to 161° C. After 15 minutes the mixture was cooled to 80° C. and Charge #2 was added. The temperature was raised to 125° C. and held for 8 hours. The nitrogen inlet was then replaced with a sparge tube that delivered an air stream under the surface of the reaction mixture. The temperature was adjusted to 50° C. and Charge #3 was added drop wise at such a rate as to keep the temperature between 50 to 70° C. 15 minutes after the completion of the addition, the isocyanate content was monitored by infra-red spectroscopy. The band at 2267 cm$^{-1}$ was absent, indicating that the reaction was complete.

Example 3

|  | Ingredients | Parts by weight |
|---|---|---|
| Charge # 1 | BiOH 1560 | 204.97 |
|  | DL-lactide | 244.34 |
|  | toluene | 47.95 |
| Charge # 2 | Stanous octoate | 0.69 |
|  | toluene | 2.05 |
| Charge # 3 | 2,6-di-tert-butyl-4-methylphenol | 0.61 |
|  | AOI | 113.78 |

Charge #1 was added into a flask equipped with a stirrer, a nitrogen inlet, a thermocouple, and set up for azeotropic distillation with a toluene filled Dean-Stark trap topped by a water-cooled condenser. Stirring and a nitrogen flow were started and the temperature was increased to 168° C. After 15 minutes the mixture was cooled to 80° C. and Charge #2 was added. The temperature was raised to 125° C. and held for 8 hours. The nitrogen inlet was then replaced with a sparge tube that delivered an air stream under the surface of the reaction mixture. The temperature was adjusted to 50° C. and Charge #3 was added drop wise at such a rate as to keep the temperature between 50 to 70° C. 15 minutes after the completion of the addition, the isocyanate content was monitored by infra-red spectroscopy. The band at 2267 cm$^{-1}$ was absent, indicating that the reaction was complete.

Examples 4-6

Radiation curable coating compositions were prepared by mixing the ingredients listed in the table below. The resulting combinations were filtered twice with a 0.45 μm filter.

| Component | Example 4 | Example 5 | Example 6 |
|---|---|---|---|
| NANOCRYL C150[4] | 28.41 | 28.41 | 28.41 |
| Resin from Example 1 | 28.41 | — | — |
| Resin from Example 2 | — | 28.41 | — |
| Resin from Example 3 | — | — | 20.41 |
| SARTOMER SR399[5] | — | — | 8.0 |
| DARACURE 1173[6] | 1.38 | 1.38 | 1.38 |
| IRGACURE 184[7] | 1.02 | 1.02 | 1.02 |
| GENOCURE MBF[8] | 0.17 | 0.17 | 0.17 |
| Propylene glycol monomethyl ether acetate | 5.71 | 0 | 0 |
| n-butyl acetate | 20.0 | 40 | 40 |
| Isobutanol | 14.29 | 0 | 0 |
| TEGOrad 2100[9] | 0.60 | 0.60 | 0.60 |

[4]Silica organo sol, available from Hanse Chemie AG, Geesthacht that is a 50/50 weight percent dispersion of amorphous silica particles having an average primary particle size of about 20 nanometers in trimethylolpropane triacrylate.
[5]Dipentaerythritol pentaacrylate, available from Sartomer Company, Inc., Exton, PA.
[6]Photoinitiator, available from CIBA Specialty Chemicals.
[7]Photoinitiator, available from CIBA Specialty Chemicals.
[8]Photoinitiator, available from Rahn, Inc.
[7]Polyether modified acryl functional polydimethylsiloxane, available from Byk-Chemie.
[9]Flow modifier commercially available from Tego Chemie, Essen, Germany.

To prepare coatings from the above compositions, MAKROLON transparent polycarbonate plaques (Bayer AG) were wiped with 2-propanol. The coating solutions were spin applied on the un-primed plaques and cured with H bulb with UVA dosage of 1 J/cm$^2$ and intensity of 0.6 W/cm$^2$ under air. The coatings had a final dry film thickness of about 20 μm. Coated samples were evaluated for adhesion and hardness.

As demonstrated in the table below, coatings containing reaction products of soy polyol, lactide and AOI (Example 5 and Example 6) had better adhesion than the coating containing the reaction product of soy polyol and AOI (Example 4).

| Testing | Example 4 | Example 5 | Example 6 |
|---|---|---|---|
| Bio Content[10] | 30.21 | 36.03 | 27.68 |
| Adhesion[11] | 1 | 5 | 5 |

[10]Bio-content: the percent of weight of bio-material over total coating weigh in the dry film.
[11]Crosshatch adhesion. Rating scale 0 (total adhesion loss) to 5 (100% adhesion after tape pull).

Whereas particular embodiments of this invention have been described above for purposes of illustration, it will be evident to those skilled in the art that numerous variations of the details of the present invention may be made without departing from the invention as defined in the appended claims.

Therefore we claim:

1. A radiation curable coating comprising a reaction product of:
   a) a natural oil derived polyol containing hydroxyl groups introduced through modification of a naturally occurring carbon-carbon double bond in a natural oil;
   b) a lactide; and
   c) a compound comprising a radiation curable moiety, wherein the radiation curable moiety is on the terminus of the reaction product and not within the backbone of the reaction product.

2. The coating of claim 1, wherein the natural oil derived polyol and the lactide are reacted first and then further reacted with the compound comprising the radiation curable moiety.

3. The coating of claim 1, wherein the natural oil derived polyol comprises soy polyol.

4. The coating of claim 1, wherein 40 weight % or greater of the carbon content of the reaction product is biomass derived, with weight % based on the total weight of the reaction product.

5. The coating of claim 1, wherein 60 weight % or greater of the carbon content of the reaction product is biomass derived, with weight % based on the total weight of the reaction product.

6. The coating of claim 1, wherein 25 weight % or greater of the carbon content of the coating, when cured, is biomass derived, with weight % based on the total solids weight of the coating.

7. The coating of claim 1, wherein 50 weight % or greater of the carbon content of the coating, when cured, is biomass derived, with weight % based on the total solids weight of the coating.

8. The coating of claim 1, wherein the coating further comprises a thermosetting moiety and the coating is a dual cure coating.

9. The coating of claim 8, wherein the thermosetting moiety comprises a hydroxyl functional resin and the coating further comprises an isocyanate functional crosslinker.

10. The coating of claim 1, wherein the compound comprising a radiation curable moiety comprises a (meth)acrylate.

11. The coating of claim 10, wherein the (meth)acrylate comprises acryloyloxy ethyl isocyanate.

12. The coating of claim 10, wherein the (meth)acrylate comprises the reaction product of a diisocyanate and a hydroxyalkyl acrylate.

13. A substrate coated at least in part with the coating of claim 1.

14. The substrate of claim 13, wherein the substrate is metallic.

15. The substrate of claim 13, wherein the substrate is non-metallic.

16. The substrate of claim 15, wherein the substrate is polymeric.

17. The substrate of claim 15, wherein the substrate is PC/ABS.

18. The substrate of claim 15, wherein the substrate is nylon.

19. The substrate of claim 15, wherein the substrate is wood.

* * * * *